July 16, 1957 G. A. LYON 2,799,536
WHEEL STRUCTURE
Filed Nov. 21, 1952 2 Sheets-Sheet 1
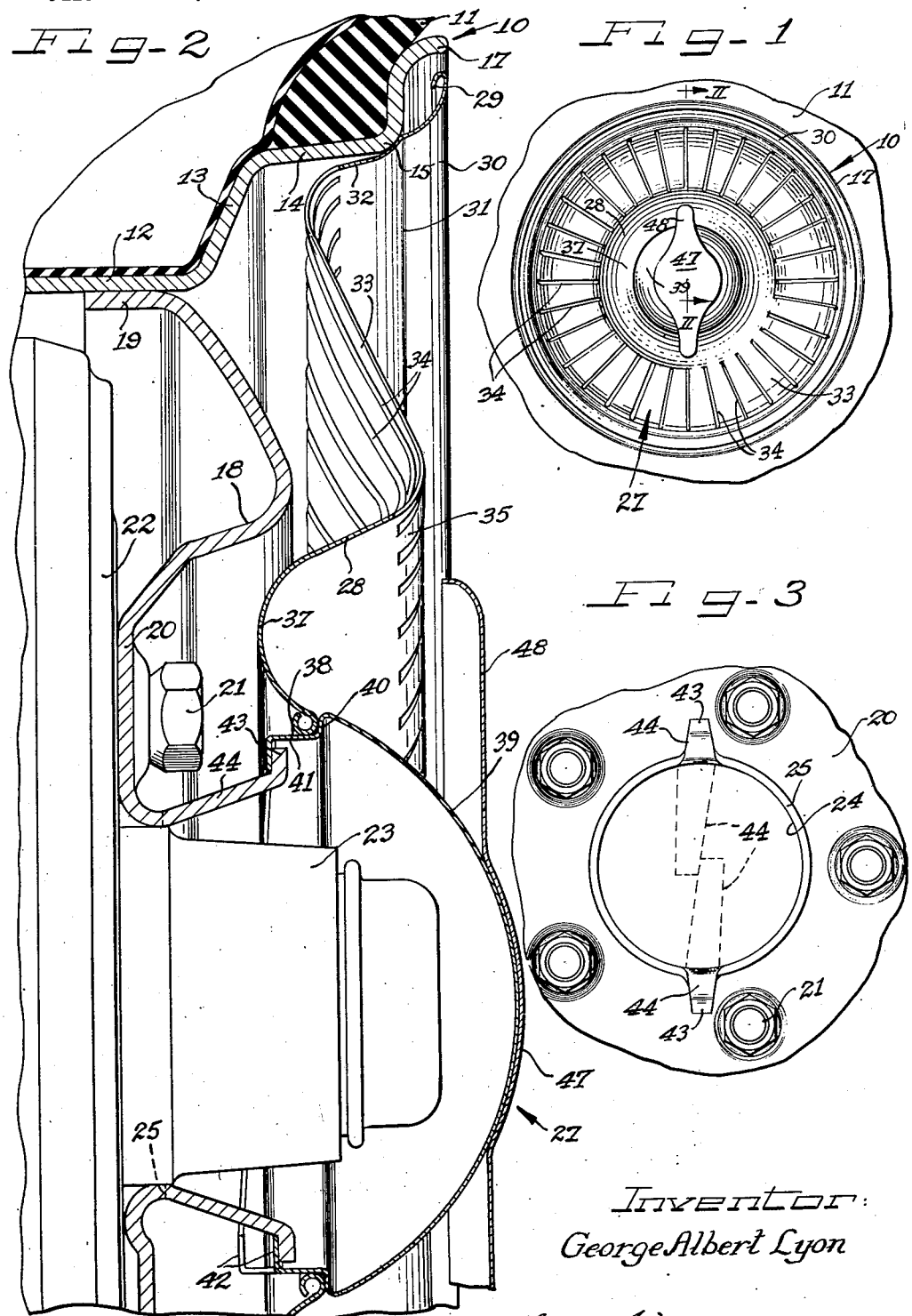
Inventor:
George Albert Lyon

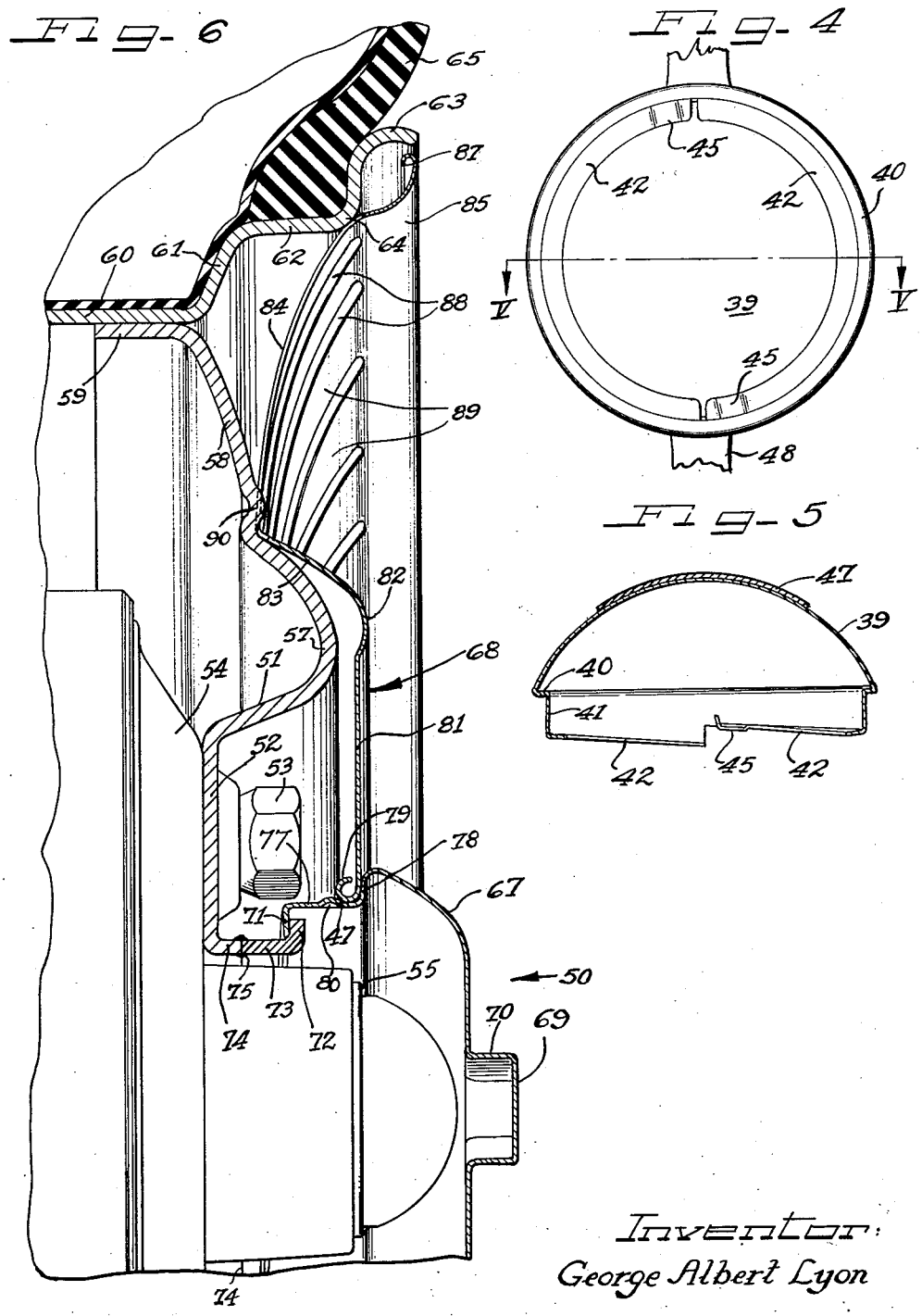

United States Patent Office 2,799,536
Patented July 16, 1957

2,799,536

WHEEL STRUCTURE

George Albert Lyon, Detroit, Mich.

Application November 21, 1952, Serial No. 321,848

8 Claims. (Cl. 301—37)

The present invention relates to improvements in wheel structures and more particularly concerns the ornamental and protective covering of the outer sides of vehicle wheels.

An important object of the present invention is to provide a wheel structure wherein a cover member is applied in protective, ornamental relation to the outer side of the wheel.

Another object of the invention is to provide a wheel structure wherein a cover is applied to the wheel and retained in tensioned engagement with the wheel by central hold-on means.

Still another object of the invention is to provide improved means on a vehicle wheel for retaining a cover thereon.

A further object of the invention is to provide an improved composite vehicle wheel cover.

Other objects, features and advantages of the present invention will be readily apparent from the following detailed description of certain preferred embodiments thereof taken in conjunction with the accompanying drawings, in which:

Figure 1 is a side elevational view of a vehicle wheel embodying features of the invention;

Figure 2 is a fragmentary radial sectional view taken substantially on the line II—II of Figure 1;

Figure 3 is a fragmentary elevational view of the central portion of the wheel body;

Figure 4 is a rear elevational view of the central retaining cap member of the cover assembly of Figures 1 and 2;

Figure 5 is a transverse sectional view taken substantially on the line V—V of Figure 4; and Figure 6 is a radial sectional view through a modified form of wheel structure.

A wheel embodying features of the invention comprises a tire rim 10 of the multi-flange, drop-center type adapted to support a pneumatic tire and tube assembly 11. The tire rim comprises a base flange 12 merging with a side flange 13 from which extends axially outwardly and sloping radially outwardly an intermediate flange 14. Merging with the intermediate flange 14 on a shoulder 15 is a terminal flange 17.

The tire rim 10 is supported by a wheel body 18 which is preferably of the disk spider type having an outer marginal axially inwardly extending attachment flange 19 secured in suitable manner to the base flange 12 of the tire rim. The wheel body 18 has a central dished bolt-on flange 20 which is adapted to be secured by means of attachment bolts 21 to a hub flange 22 of a vehicle axle structure including a central axially outwardly projecting hub structure 23. For projection therethrough of the hub structure 23, the bolt-on flange 20 of the wheel body has a central aperture 24 defined by a generally axially outwardly projecting annular reinforcing flange 25.

For covering the outer side of the wheel a wheel cover 27 is provided. In the present instance the wheel cover 27 is of a magnitude and extent to substantially cover the entire wheel including the wheel body 18 and the tire rim 10. To this end, the cover 27 comprises a preferably annular cover member 28 which is preferably in the form of a sheet metal plate comprising stainless steel or brass or the like and having a fair degree of resilience. The outside diameter of the cover plate 28 is preferably such as to extend within and close to the extremity flange portion of the terminal flange 17 of the tire rim, with the edge portion of the cover plate turned under to provide a reinforcing and finishing flange 29. The marginal portion of the cover plate comprises preferably a convex bead-like or rib portion 30 extending generally radially and axially inwardly and merging on an indented annular shoulder 31 with an intermediate portion of the cover plate including a radially outer annular solid portion 32 merging with a generally radially inwardly and axially outwardly extending uniformly longitudinally slotted portion 33. The portion 33 by virtue of the flexible ribs into which it is divided by slots 34 is relatively flexible. The slots 34 cut into a convex juncture portion 35 where the slotted portion 33 of the cover merges with an annular dished portion 37 having an inner marginal underturned reinforcing bead 38 of an inside diameter preferably larger than the diameter of the aperture 24 in the wheel body bolt-on flange.

For retaining the cover member 28 on the wheel under tension, a central closure and retaining cap 39 is provided which is of slightly greater diameter than the central aperture in the cover plate 28 and has a marginal rabbet groove shoulder 40 engageable against the bead 38. The cap member 39 provides a chamber into which the hub structure 23 projects. Extending axially inwardly from the shoulder 40 within the bead 38 is an annular flange 41 on the cap member having at its inner margin identical opposite sloping cam flanges 42 (Figs. 2, 4 and 5) which project radially inwardly and are retainingly engageable with radially outwardly extending lug flanges 43 on retaining lugs 44 projecting generally axially and radially outwardly from the bolt-on flange 20 of the wheel body.

As indicated in Fig. 3, the retaining lugs or fingers 44 are preferably formed up from material derived from the center of the wheel body bolt-on flange 20 in the formation of the central aperture 24. The fingers may be derived from material across the center of the wheel body as indicated in dash outline in Fig. 3 and are then bent up into operative position as integral extensions from the flange 25.

The retaining flanges 42 have their adjacent ends offset in complementary relation so that the retaining lugs 43 are engageable with the axially outer sides of the cam flanges 42 by turning the flanges into the lugs 43 so that the lugs 43 enter over the axially innermost end portions of the flanges 42 and then as the cap 39 is turned clockwise and the flanges 42 ride progressively onto the lugs 43, the cap 39 will be drawn inwardly to the axially outermost limits of the respective flanges 42 wherein the lugs 43 snap into detent recesses 45 (Figs. 4 and 5).

To facilitate turning the cap member 39, it is preferably provided with a handle member 47 having a central complementary crown portion nested upon the crown of the cap 39 and secured thereto as by means of spot welding. Oppositely extending handle ears 48 on the handle member facilitate manipulation of the handle and thereby the cap.

In applying the cover to the wheel, the shoulder 31 of the cover is applied to the shoulder 15 of the tire rim and the cover member 28 is thereby held substantially centered, with the central dished portion 37 of the cover member disposed in a substantially further axially outward position than shown in Fig. 2. Then by pressing inwardly on the cap member 39, the dished portion 37 of the cover member is flexed inwardly and after the cap member 39 has been engaged with the retaining lugs 43 and turned down to the limit of retaining engagement, the cover member 28 is held under substantial tension against the tire rim. Thereby the cover is retained against rattling or displacement from the wheel. Removal of the cover is easily effected by reverse turning of the cap member 39 to release the same from the retaining lugs 43.

In the modification of Figure 6, a cover assembly 50 is applied to the outer side of a vehicle wheel comprising a wheel body 51 of the disk spider type having a central dished bolt-on flange 52 which is secured by means of attachment bolts 53 to a flange structure 54 of an axle hub 55 of a vehicle. The wheel body has adjacent to the bolt-on flange 52 an annular axially outwardly projecting reinforcing nose bulge 57 which in the present instance is of limited width and merges with a generally radially and outwardly extending and axially inwardly sloping marginal portion 58 which has an axially inwardly extending extremity marginal flange 59 which is attached in suitable manner to a base flange 60 of a tire rim. The tire rim is of the multi-flanged drop-center type having a side flange 61 merging with an intermediate flange 62 and terminating at the outer side in a terminal flange 63 which merges with the intermediate flange on a rounded shoulder 64. The tire rim is adapted to support a pneumatic tire and tube assembly 65.

The cover assembly 50 comprises a central cover member 67 and an annular cover member 68 which is arranged to be secured to the wheel by the central cover member. For this purpose, central cover member 67 comprises a cap-like member dimensioned to overlie the central portion of the bolt-on flange 52 and conceal the hub structure 55. A central axially outwardly projecting embossment 69 on the central cover member is provided with side wrench faces 70 so that it can be engaged by a wrench such as the wrench by which the nuts of the attachment bolts 53 are attached for turning the central cap member 67. Such turning is for the purpose of engaging or disengaging inturned cam flanges 71 on the inner extremity of the cap member 67 with respect to outturned terminal engagement lugs 72 on respective extension fingers 73 on an annular axially outwardly extending inner marginal flange 74 on the bolt-on flange 52 of the wheel body defining a central aperture through which the hub structure 55 extends. In the present instance, the extensions 73 may be formed separate from the flange 74 and welded thereto at 75 so that they become functionally integral parts of the flange 74. It will be understood that the extensions 73 may be disposed at diametrically opposite sides of the flange 74 similarly as the extensions 44 of the invention as shown in Figs. 2 and 3. It will also be understood that the cam flanges 71 are preferably similar to the cam flanges 42 of the invention as disclosed in Figs. 2, 4 and 5.

The attachment cam flanges 71 are terminals of a side wall or flange 77 of the cap member 67 and are joined to the cap member by a generally axially inwardly facing offsetting shoulder 78. In addition to rigidifying the side of the cap 67, the shoulder 78 provides for engagement with an inner marginal bead 79 on the annular cover member 68. A series of radially outwardly projecting embossed retaining protrusions 80 in the flange 77 oppose the axially inner side of the bead 79 and retain the same in association with the shoulder 78 for relative rotary movement of the cap and the inner margin of the cover member 68.

From the bead 79, the annular cover member 68 extends radially outwardly in a preferably substantially flat annular area 81 which is preferably of diaphragm-like resilience and opposite the nose bulge 57 of the wheel body joins a convex rib-like annular portion 82 having an outer generally axially inwardly and radially outwardly extending flange portion 83 arranged to extend to the juncture between the outer side of the nose bulge 57 and the wheel body portion 58. Thence the annular cover member 68 extends generally radially outwardly and slopes axially outwardly in a portion 84 that bridges across the juncture between the wheel body and the tire rim and at its outer portion bears against the shoulder 64 of the tire rim, merging with a marginal convex annular reinforcing rib portion 85 overlying the terminal flange 63 and having an underturned outer extremity reinforcing and finishing flange bead 87. The intermediate cover portion 84 is preferably formed with a radial series of slots 88 by which the intermediate portion is subdivided into a series of spoke-like resilient connecting portions 89 between the cover portion 83 and the outer marginal reinforcing rib portion 85. The slots 88, moreover, enable circulation of air through the cover portion 84.

In applying the cover 50 to the wheel, it is generally centered with respect to the wheel and the juncture portion of the annular cover member adjacent the outer ends of the slots 88 is applied to the shoulder 64 of the tire rim. At this time, the juncture of the intermediate cover portion 84 and the cover portion flange 83 will be spaced out from the wheel body so that axially inward pressure to deflect the intermediate cover portion 84 axially inwardly will be necessary to effect contact of the inner juncture portion against the wheel body. In addition, inward flexure of the inner annular portion 81 of the annular cover member may be effected as an incident to turning the cap member 67 down into retaining engagement with the retaining lugs 72 of the wheel body. Thereby the annular cover member 68 is held under substantial resilient tension or compression against the wheel.

To prevent turning of the annular cover portion 68 on the wheel in service due to running torque of the wheel, the wheel body 51 is preferably provided with means interengaging with the annular cover member 68. To this end, the wheel body is provided with one or more axially outwardly projecting turn-preventing bosses 90 adjacent juncture of the wheel body portions 57 and 58 engageable in the inner end portion of respective one or more of the slots 88 depending on the number of the turn-preventing embossments 90 provided. One of the turn-preventing embossments or bumps 90 will usually be ample for the purpose. Thus, when the cover member 68 has been tensioned against the wheel, the edges defining the inner end of the slot 88 through which the turn-preventing embossment 90 extends, by engaging the opposite sides of the embossment 90 hold the cover against turning.

Removal of the cover 50 is, of course, easily effected by turning the cap member 68 in reverse to disengage the retaining flanges 71 from the retaining lugs 72, whereupon the cover can be lifted away from the wheel.

It will be understood that modifications and variations may be effected without departing from the scope of the novel concepts of the present invention.

I claim as my invention:

1. In a wheel structure including tire rim and wheel body members, the wheel body member having central integral outwardly directed lugs, an annular cover member engaging one of said members and having a central opening defined by a margin, a central cover member having an annular shoulder facing generally axially inwardly and engaging said margin, said central cover member having a flange projecting axially inwardly beyond said margin and including turned cam flange means retainingly engageable with said lugs by turning said central cover member relative to said margin to place the annular cover member under tension between the portion of the annular cover member that engages said one member and said margin.

2. In a wheel structure including a wheel body having central retaining means for engagement by a cover structure, an annular cover member having an opening therein, the wheel body having an axially outwardly projecting embossment thereon, said cover member having an opening through which the embossment engages to hold the cover member against turning, and a central cover member engageable with said first mentioned cover member and releasably engageable with said retaining means by turning of the central cover member relative to the first mentioned cover member.

3. In a cover for disposition at the outer side of a vehicle wheel, an annular cover member having a rigid inner margin, a rigid outer margin, an intermediate rigidifying rib, a flexible annular portion between the inner margin and said intermediate rib, and a flexible portion between said intermediate rib and said outer rigid margin, the latter flexible portion having a plurality of openings therethrough defining a plurality of flexible connecting elements.

4. In a wheel structure including a wheel body and a tire rim supported thereby, a cover for disposition at the outer side of the wheel having elongated openings therein and means for attachment of the cover to the wheel, the wheel body having a projection theron interengaging with the cover within one of said openings to hold the cover against turning on the wheel.

5. In a wheel structure including a wheel body having a central bolt-on flange with a central aperture for projection therethrough of the hub of a vehicle axle structure, said bolt-on flange having adjacent to said opening and projecting axially outwardly rigid cover retaining structure, and a cover for disposition at the outer side of the wheel including an annular cover member having a portion for bottoming against the wheel spaced radially outwardly relative to said bolt-on flange and with a radially inner marginal portion thereby held spaced substantially axially outwardly from said bolt-on flange but overlying the bolt-on flange, the cover including also a central rotatable circular member provided with a generally axially extending annular wall having an intermediate generally axially inwardly facing offset shoulder slidably bearingly engageable with said annular cover member inner margin and axially inwardly extending flange means at the inner side of said shoulder projecting through the central opening in said annular cover member and engageable retainingly with said cover retaining structure responsive to rotary movement of the central cover member, the central cover member applying axially inward tensioning pressure to said inner annular cover member margin and the inner annular cover margin providing axially outward thrust to said central cover member through said shoulder whereby to maintain the central cover member firmly in engagement with said cover retaining structure.

6. In a wheel structure including a tire rim and a disk spider wheel body having a dished central bolt-on flange with a central hub clearance opening defined by a narrow axially outwardly projecting annular flange, said flange having a plurality of rigid narrow elongated generally axially outwardly extending cover-retaining lugs provided with generally radially outwardly projecting retaining terminals, a cover for disposition at the outer side of the wheel including a central portion with generally radially inwardly turned cam flange structure engageable frictionally and releasably rotatably with said retaining terminals, and a radially outer cover portion engageable axially with the wheel and affording radially outward tension thrust to said central portion for maintaining said cover flange structure in the retaining engagement with said terminals.

7. In a wheel structure including a wheel body and a tire rim supported thereby, a cover for disposition at the outer side of the wheel having an intermediate portion provided with an opening, means on the cover and the wheel spaced from said opening for attachment of the cover to the wheel, and a projection on the wheel body interengageable with the cover within said opening to retain the cover against turning on the wheel.

8. In a wheel structure including a tire rim and a disk spider wheel body having a dished central bolt-on flange, said wheel body having a plurality of generally axially outwardly projecting cover-retaining members providing generally radially projecting and axially inwardly facing retaining terminals spaced substantially from said bolt-on flange, a cover for disposition at the outer side of the wheel including a central portion arranged to remain substantially spaced axially outwardly relative to said bolt-on flange and having cam flange structure turned radially oppositely to said retaining terminals and engageable frictionally and releasably rotatably with the axially inner side of said retaining terminals, and a radially outer cover portion engageable axially with the wheel and thereby affording radially outward tensioning thrust for said central portion for maintaining said cover cam flange structure in retaining engagement with said terminals.

References Cited in the file of this patent

UNITED STATES PATENTS

| | | |
|---|---|---|
| D. 168,466 | Lyon | Dec. 23, 1952 |
| 1,401,939 | Baumler | Dec. 27, 1921 |
| 2,006,747 | Ritz-Woller | July 2, 1935 |
| 2,124,789 | Lyon | July 26, 1938 |
| 2,159,881 | Booth | May 23, 1939 |
| 2,308,617 | Lyon | Jan. 19, 1943 |
| 2,576,683 | Horn | Nov. 27, 1951 |
| 2,669,487 | Horn | Feb. 16, 1954 |

FOREIGN PATENTS

| | | |
|---|---|---|
| 421,260 | Italy | May 20, 1947 |
| 836,295 | Germany | Apr. 10, 1952 |